No. 705,637. Patented July 29, 1902.
R. R. BLANDY.
MEANS APPLICABLE FOR USE IN TRANSPORTING FRUIT.
(Application filed Apr. 15, 1901.)
(No Model.)
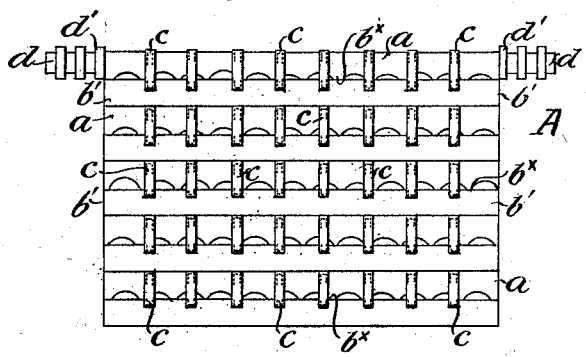
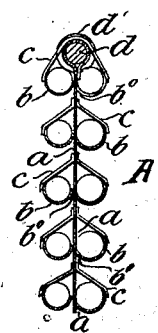
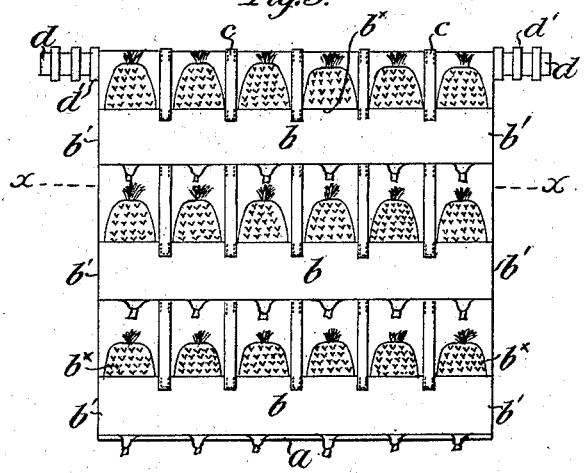
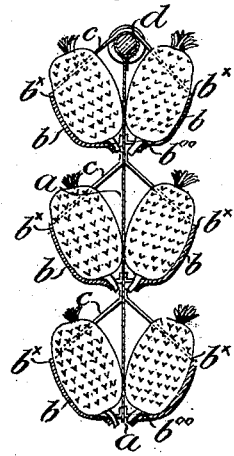
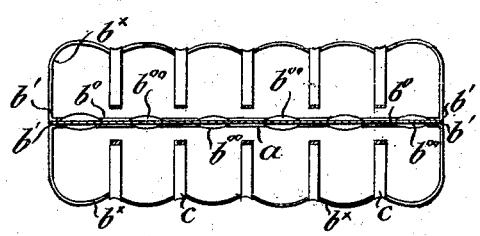
Witnesses
Inventor
R. R. Blandy

UNITED STATES PATENT OFFICE.

RICHARD R. BLANDY, OF KENSINGTON, ENGLAND.

MEANS APPLICABLE FOR USE IN TRANSPORTING FRUIT.

SPECIFICATION forming part of Letters Patent No. 705,637, dated July 29, 1902.

Application filed April 15, 1901. Serial No. 55,962. (No model.)

*To all whom it may concern:*

Be it known that I, RICHARD RIDPATH BLANDY, a subject of the King of Great Britain and Ireland, residing at 46 Cheniston Gardens, Kensington, in the county of London, England, have invented certain new and useful Improved Means Applicable for Use in Transporting Oranges and other Kinds of Fresh Fruit, (in respect whereof I have applied for a patent in Great Britain, to bear date March 21, 1901, No. 5,989,) of which the following is a specification.

This invention relates to improved means applicable for use in the transportation, both by land and sea, of oranges, pineapples, and other descriptions of fresh fruit which are readily susceptible to injury in handling or which when packed in boxes, barrels, or the like are liable to suffer from the crushing effect of the superincumbent mass.

In the accompanying drawings, Figure 1 is an elevation illustrating the application of my invention to the transportation of oranges, Fig. 2 being a transverse section thereof. Fig. 3 is an elevation, Fig. 4 a transverse section, and Fig. 5 a horizontal section, on the line $xx$ in Fig. 3, of the carrier applied to the transportation of pineapples or similar "stalked" fruit.

Referring to Figs. 1 and 2, wherein my invention is applied, by way of example, in the transportation of oranges, I construct a carrier A of the following description and employ it in the manner hereinafter explained: Upon each side of a sheet of canvas $a$ or other suitable fabric I arrange horizontally and at suitable intervals one above another several strips of canvas $b\ b$. Each strip is stitched along one of its edges $b^0$ to the canvas sheet $a$, while its opposite or outer edge $b^\times$ is turned upward and by means of tapes $c\ c$ is also attached to the sheet $a$, these tapes being arranged at distances apart which by preference correspond with the spaces occupied by the oranges. Under such circumstances each strip forms a trough or elongated pocket adapted for the reception of a dozen or other convenient number of oranges, the extremities $b'\ b'$ of the strip being stitched in such a manner as to close the ends of the trough. Commencing by preference with the lowest trough, each is successively charged throughout its length with oranges, each orange being separately introduced between each pair of tapes $c\ c$. The several pockets are arranged at such a distance one above another that each covers and practically closes the upper or open portion of the trough next below.

The canvas sheet $a$, furnished on one, but preferably on both, sides, in the manner above described, is attached at its upper edge to a pole or bar $d$, whereby the whole carrier when fully charged with fruit is lifted or whereby it is carried while in course of transport either by land or sea, the pole or bar being formed at its extremities with collars $d'\ d'$ for securing the same against longitudinal movement when mounted in suitable supports with which the cart, railway-wagon, store, or ship's hold is provided.

In adapting my invention for the transportation of pineapples or similar stalked fruit instead of stitching each strip $b\ b$ throughout its entire length to the canvas sheet I leave gaps $b^{00}$ at suitable intervals. Through these gaps the stalks of the pineapples are inserted, the fruit being thus maintained in an erect position, and being, moreover, supported on either side by the tapes $c\ c$, which extend between the outer edge $b^\times$ of the canvas strip $b$ and the canvas sheet $a$.

The oranges, pineapples, or other fruit having been packed at the gardens where they are grown in carriers of the kind above described, remain in this condition until they reach their ultimate market and without being handled in any way. It will also be observed that during the entire process of transportation the weight of each individual fruit is separately supported and that they only touch one another laterally, if at all, and without pressure. Each individual fruit is equally accessible to ventilation, and as a portion of each is exposed to view any deficiency owing to pilfering or other cause is readily detected.

What I claim as my invention, and desire to secure by Letters Patent, is—

1. For use in transporting oranges and other kinds of fresh fruit, a sheet of fabric furnished with series of pockets or troughs comprising horizontal strips of fabric severally connected along their upper edges to the sheet by means of tapes and having their lower edges and extremities also attached to the sheet whereby the pockets are adapted to receive and support the fruits arranged singly, and to prevent their being subjected to pressure.

2. For use in transporting oranges and other kinds of fresh fruit, a carrier consisting of a sheet of fabric to which a number of horizontal strips of fabric are severally attached one above another by stitching the inner or lower edge and the extremities of each strip to the sheet and tapes connecting the outer edge of each strip with the sheet, thus constituting troughs or pockets, and a pole or bar to which the sheet is attached for the purpose of supporting the fruit while in course of transportation, substantially as herein described.

R. R. BLANDY.

Witnesses:
WM. V. BROWN,
PERCY E. MATTOCKS.